United States Patent
Schliwa et al.

(10) Patent No.: US 9,382,005 B2
(45) Date of Patent: Jul. 5, 2016

(54) CABIN SEGMENT, CABIN AND VEHICLE WITH A CABIN

(71) Applicant: Airbus Operations GmbH, Hamburg (DE)

(72) Inventors: Ralf Schliwa, Dollern (DE); Maria Strasdas, Jork (DE)

(73) Assignee: Airbus Operations GmbH (DE)

( * ) Notice: Subject to any disclaimer, the term of this patent is extended or adjusted under 35 U.S.C. 154(b) by 214 days.

(21) Appl. No.: 14/045,233

(22) Filed: Oct. 3, 2013

(65) Prior Publication Data

US 2014/0048650 A1 Feb. 20, 2014

Related U.S. Application Data

(63) Continuation of application No. PCT/EP2012/001392, filed on Mar. 29, 2012.

(60) Provisional application No. 61/471,471, filed on Apr. 4, 2011.

(30) Foreign Application Priority Data

Apr. 4, 2011 (DE) .......................... 10 2011 016 031

(51) Int. Cl.
*B64D 13/00* (2006.01)
*B64D 11/02* (2006.01)
(Continued)

(52) U.S. Cl.
CPC ................ *B64D 11/02* (2013.01); *B64D 11/00* (2013.01); *B64D 11/04* (2013.01); *B64D 11/06* (2013.01); *B64D 11/0691* (2014.12); *B64D 2011/0046* (2013.01)

(58) Field of Classification Search
CPC ............................. B64D 11/04; B64D 11/0691
See application file for complete search history.

(56) References Cited

U.S. PATENT DOCUMENTS 3,594,037 A * 7/1971 Sherman ......................... 297/14
4,740,030 A    4/1988 Nordskog
(Continued)

FOREIGN PATENT DOCUMENTS

CN          101595030        12/2009
DE         36 29 505 A1       3/1988
(Continued)

OTHER PUBLICATIONS

Chinese Office Action for Application No. 201280016452.8 dated Dec. 2, 2014.
(Continued)

*Primary Examiner* — Jerry Redman
(74) *Attorney, Agent, or Firm* — Lerner, David, Littenberg, Krumholz & Mentlik, LLP

(57) ABSTRACT

A cabin segment for a vehicle includes two or more parking spaces, arranged side by side and separated from each other by at least one intermediate wall, for accommodating serving trolleys, and furthermore a vehicle attendant seat which on one side is held on one of the at least one intermediate walls so as to be pivotable on an axis. The vehicle attendant seat is pivotable to an in-use position and to an out-of-the-way position. The in-use position and the out-of-the-way position are situated apart by 90° or more relative to the pivoting of the vehicle attendant seat. This makes possible particularly efficient use of space without having to forego parking spaces or a vehicle attendant seat.

14 Claims, 8 Drawing Sheets

(51) Int. Cl.
  *B64D 11/00* (2006.01)
  *B64D 11/04* (2006.01)
  *B64D 11/06* (2006.01)

(56) References Cited

U.S. PATENT DOCUMENTS

| | | | |
|---|---|---|---|
| 5,474,260 | A | 12/1995 | Schwertfeger et al. |
| 8,136,763 | B2 | 3/2012 | Saint-Jalmes et al. |
| 8,469,311 | B2 | 6/2013 | Saint-Jalmes et al. |
| 2005/0264058 | A1* | 12/2005 | Schumacher et al. ........ 297/232 |
| 2008/0001031 | A1 | 1/2008 | Doebertin et al. |
| 2009/0261200 | A1 | 10/2009 | Saint-Jalmes et al. |
| 2010/0181425 | A1 | 7/2010 | Guering et al. |
| 2012/0032026 | A1 | 2/2012 | Becker et al. |
| 2014/0252830 | A1* | 9/2014 | Johnson et al. ............... 297/337 |
| 2014/0312173 | A1* | 10/2014 | Ehlers et al. ................ 244/118.6 |
| 2014/0319275 | A1* | 10/2014 | Najd et al. .................. 244/118.6 |
| 2014/0368012 | A1* | 12/2014 | Burd ............................. 297/337 |
| 2015/0203203 | A1* | 7/2015 | McIntosh |
| 2015/0232185 | A1* | 8/2015 | Johnson et al. |

FOREIGN PATENT DOCUMENTS

| | | |
|---|---|---|
| DE | 43 00 877 A1 | 7/1994 |
| DE | 10 2009 008355 A1 | 8/2010 |
| DE | 102012023045 A1 * | 5/2014 |
| EP | 2583897 A1 * | 4/2013 |
| EP | 2690016 A2 * | 1/2014 |
| EP | 2796371 A1 * | 10/2014 |
| EP | 2851296 A1 * | 3/2015 |
| FR | 2910436 A1 | 6/2008 |
| FR | 2 929 244 A1 | 10/2009 |
| RU | 16495 U1 | 1/2001 |
| WO | 2008070835 A1 | 6/2008 |
| WO | 2010092047 | 8/2010 |
| WO | 2010/120811 A2 | 10/2010 |
| WO | 2012/110643 A1 | 8/2012 |

OTHER PUBLICATIONS

Chinese Office Action dated Nov. 25, 2015.
Russian Notice of Allowance (Jan. 20, 2016).

* cited by examiner

CABIN SEGMENT, CABIN AND VEHICLE WITH A CABIN

CROSS-REFERENCE TO RELATED APPLICATIONS

The present application is a continuation of International Application No. PCT/EP2012/001392, filed Mar. 29, 2012, which claims priority from German Patent Application No. 10 2011 016 031.0 filed on Apr. 4, 2011 and claims the benefit of the filing date of U.S. Provisional Patent Application No. 61/471,471 filed on Apr. 4, 2011, the disclosure of which applications is hereby incorporated herein by reference.

TECHNICAL FIELD

The invention relates to a cabin segment for a vehicle, to a cabin for a vehicle, which cabin comprises at least one such modular cabin segment, and to a vehicle comprising such a cabin.

BACKGROUND OF THE INVENTION

Vehicles for transporting passengers, which vehicles have a cabin with passenger seats arranged therein, usually need to meet economic expectations so that in the design of passenger cabins with limited space provided the largest-possible number of passengers is transportable. In particular if the vehicle is used to travel longer distances, apart from the passenger seats, further equipment features are required in order to ensure passenger wellbeing. Apart from toilets this also relates to equipment for heating, cooling, the preparation and storage of food and drinks.

Furthermore, in particular in commercial aircraft it is a regulatory requirement to provide a cabin attendant seat for each cabin attendant so that each cabin attendant can take up a safe position during takeoff and landing of the aircraft, which cabin attendant seat additionally occupies already confined space in the cabin.

DE 43 00 877 A1 and U.S. Pat. No. 5,474,260 A disclose an aircraft with a number of supply devices and toilets that are designed as independent conventional toilet compartments.

BRIEF SUMMARY OF THE INVENTION

An aspect of the invention proposes an advantageous design of a cabin or of a cabin segment, which design allows the best possible use of the available installation space in the cabin while meeting all the regulations and the requirements for comfort.

As aspect of the invention consists of proposing a cabin segment for a vehicle, which cabin segment comprises two or more parking spaces, arranged side by side and separated from each other by at least one intermediate wall, for accommodating serving trolleys, as well as comprising a vehicle attendant seat which on one side is held on one of the at least one intermediate walls so as to be pivotable on an axis. The vehicle attendant seat is pivotable to an in-use position and to an out-of-the-way position, and preferably comprises a locking means that is designed to lock the vehicle attendant seat in the in-use position. The in-use position and the out-of-the-way position are situated apart by more than 90° relative to the pivoting of the vehicle attendant seat.

Providing several parking spaces arranged one beside the other for receiving a serving trolley, which parking spaces are separated from each other by intermediate walls, makes it possible to provide a number of parking spaces that is limited only by the width of the design space available for the cabin segment. With the concurrent demand for providing vehicle attendant seats that in aircraft are at times also arranged on a pivotable base plate, by means of the inventive combination of parking spaces and a vehicle attendant seat a clearly improved usage of space can be achieved. In this arrangement a vehicle attendant seat needs to be pivoted to an in-use position and needs to be locked in that position only when the state of the vehicle at the time prescribes this. In an aircraft, this state could for example consist of a takeoff or landing phase being carried out, or temporarily more severe turbulence being experienced, and consequently safe seating for vehicle attendants is provided. In these phases it is usually not necessary to move serving trolleys through the cabin of the vehicle. Usually, the serving trolleys are moved to their parking spaces and locked into place in their parking spaces before such situations are reached or at the time such situations are reached. Accordingly, when locking the vehicle attendant seat in the in-use position, there should not exist an obstacle to normal operation of the vehicle in the cabin.

When the vehicle has reached a state of regular operation, during which the provision of services to passengers is possible, depending on requirements the parking space blocked by the vehicle attendant seat can be made accessible again by pivoting said vehicle attendant seat.

For this reason it appears to be particularly advantageous to only park serving trolleys in the parking spaces that follow on from the in-use position of the vehicle attendant seat, which serving trolleys accommodate items that are rarely used. This could, for example, refer to a serving trolley for waste material, which serving trolley is, for example, used in the cabin after completion of a meal in order to collect refuse. If the serving trolley is full of refuse it can be moved to the parking space behind the vehicle attendant seat where it can be locked. Only after passengers have left the vehicle is it necessary to remove the serving trolley from this position.

The locking means can, for example comprise a locking mechanism that is implemented either directly on the pivotable bearing arrangement or in a floor region. If necessary, wall thicknesses of the cabin segment must be dimensioned in such a manner that they are suitable for accommodating locking means.

A particularly preferred variant of a cabin segment according to an embodiment of the invention is provided for a region in the cabin, in which region a passage is not required. This could, for example, relate to a rear section of an aircraft, or to a front section if a separate entry to the cockpit is to be provided. In other vehicles, for example in ferries, trains or the like, a modular cabin segment according to an embodiment of the invention could also be arranged in a rear part of the vehicle in question. The use of a rear section makes sense in particular in commercial aircraft, because in them a pressure bulkhead is arranged to delimit the cabin, which pressure bulkhead comprises an outward-curvature that could be used by toilet arrangements or storage compartments for bulky items.

Below, some references relate to a longitudinal axis, a transverse axis or a vertical axis, as well to a depth, a width or a height. The term "longitudinal axis" refers to the spatial direction that correlates with a longitudinal axis of the vehicle or with a parallel to the aforesaid, wherein this longitudinal axis can also be the longitudinal axis of a cabin in which the cabin segment according to the invention is arranged. An extension along the longitudinal axis is referred to as depth. Consequently, the transverse axis refers to an axis that is arranged so as to be perpendicular to the longitudinal axis and that is horizontal. An extension in this direction is referred to as width. Accordingly, the vertical axis is the axis that extends in vertical direction and that is perpendicular both on the longitudinal axis and to the transverse axis. An extension in this direction is referred to as height.

In an advantageous embodiment of the invention the in-use position and the out-of-the-way position of the vehicle attendant seat are essentially situated apart by 180°. This means that the extensions in transverse direction of the vehicle attendant seat in the in-use position and in the out-of-the-way position are parallel to each other. By means of such an arrangement, the vehicle attendant seat can be accommodated in quite a space-saving manner in the out-of-the way position, even for extended periods of time, and does not interfere with passengers or vehicle attendants either in the in-use position or in the out-of-the-way position.

In an advantageous embodiment of the invention the cabin segment according to an embodiment of the invention comprises at least one storage compartment, arranged above the parking spaces, for accommodating objects. By arranging storage compartments, the floor space taken up by the parking spaces in the cabin can be made useable practically up to the cabin ceiling. In this manner a relatively large stowage volume can be provided.

In an advantageous embodiment of the invention the vehicle attendant seat comprises a removable headrest. Accordingly, the vehicle attendant seat could comprise a backrest whose dimensions are dimensioned so as to correspond to those of the parking spaces. In order to make stowage compartments accessible that are arranged above said parking spaces, or in order to make accessible a work surface on the parking spaces, removing a headrest is particularly sensible. This headrest could be stowed in a storage compartment provided for this purpose and located as closely nearby as possible, so that when the vehicle attendant seat is locked in the in-use position, said headrest can be removed from the stowage compartment in a single step and can be placed back onto the backrest.

In an advantageous embodiment of the invention the headrest comprises a hinge. In this manner the headrest can, for example, be folded forward or folded over so that a stowage compartment situated behind it becomes accessible.

In an advantageous embodiment of the invention the headrest comprises a handset for a communication device. This can, for example, be an on-board telephone for communication with the cockpit or with other service stations. In the case of a removable or of a fold-down headrest the handset could, if applicable, comprise a disconnectable connection to the on-board electronics.

In an advantageous embodiment of the invention the cabin segment comprises a first parking space with a first receiving opening that extends so as to be largely parallel to a width of the cabin segment, and a second parking position, arranged width-wise of the cabin segment so as to be adjacent to the aforesaid, with a second receiving opening that extends so as to be largely parallel to the width of the cabin segment, wherein between the first receiving opening and the second receiving opening there is a projection that extends in the depth of the cabin segment, and wherein a hinge is arranged on an intermediate wall that separates the first receiving opening from the second receiving opening, on which hinge an outer edge of the vehicle attendant seat is pivotally held. The vehicle attendant seat is thus arranged either in the depth of the cabin segment according to the invention in front of the parking position, or said vehicle attendant seat after being pivoted on the hinge axis is pivoted into the projection so that in accordance with the design of this projection a flush surface is created.

As an alternative or in addition to such a projection, the intermediate wall in question can also be designed so as to be projecting, so that in the direction of depth it protrudes beyond the first receiving opening and beyond the second receiving opening. On an end of the intermediate wall, which end faces away from the cabin segment according to the invention, a hinge can then be arranged that carries out a pivotable connection with an outer edge of a vehicle attendant seat.

It is evident to the average person skilled in the art that such a cabin segment can comprise more than only one single vehicle attendant seat. The number of the parking positions and of the vehicle attendant seats that can be accommodated directly depends on the width of the available design space within the cabin.

Furthermore, the vehicle kind is not limited to a particular type; instead, any type of water craft, terrestrial craft or aircraft comprising a cabin for accommodating passengers can comprise such a cabin segment.

A cabin segment according to an embodiment of the invention, with an arrangement as mentioned above comprising several parking spaces and at least one vehicle attendant seat arranged thereon, can comprise both a fixed design, which is essentially in one piece, with a non-variable arrangement of components or can comprise a modular design in which various components can be composed to form a cabin segment according to an embodiment of the invention. Below, the integration of the inventive arrangement of parking spaces and vehicle attendant seats is set out with reference to a modular design of the cabin segment.

A modular design of a cabin segment according to an embodiment of the invention makes possible the composition according to requirements of various modules so that a cabin segment that is particularly advantageous to the operator of the vehicle concerned can be provided. In this document the term "module" refers to a part, to a component or to a section of a finished cabin segment. As a result of the modularity, each operator of the vehicle can compose a cabin segment without having to resort to a cost-intensive individual solution. At the same time it makes economic sense to the manufacturer of the vehicle, because many different variants of a cabin segment can be proposed without the need to conceive lengthy and cost-intensive individual solutions.

A modular design of a cabin segment according to an embodiment of the invention in an advantageous embodiment comprises, for example, a first lateral segment module that accommodates a first toilet arrangement with at least one toilet compartment. In this embodiment a second lateral segment module is provided, wherein in each case a lateral surface of the first and of the second lateral segment module is designed to adapt to an inner wall of the cabin of the vehicle so as to correspond to said inner wall. According to an embodiment of the invention at least one of the modules comprises a vehicle attendant seat that on an outside edge is held on an intermediate wall between two parking spaces so as to pivot on a vertical axis. Accordingly, the cabin segment according to an embodiment of the invention extends in a transverse axis preferably from a sidewall of a cabin that is to comprise the cabin segment according to the invention to the opposite sidewall, wherein in this space at least a first lateral segment module and a second lateral segment module are arranged. The function of the first lateral segment module is not limited to its use as a toilet arrangement. Instead, the respective operator of the vehicle that comprises a cabin with at least one cabin segment according to the invention can compose a cabin segment from various modules.

In an advantageous embodiment of the invention the cabin segment furthermore comprises at least one central module that is arranged between the first lateral segment module and the second lateral segment module.

In a particularly advantageous embodiment the second lateral segment module is a galley module which in the simplest case comprises only the parking spaces and any storage compartments for accommodating food, cutlery, serviettes, auxiliary utensils and the like, wherein the storage compartments, in particular when used in an aircraft, comprise covers with a locking mechanism so that the objects held therein are secured against falling out. If required, one or several parking spaces can also comprise a cooling device, or can be connected to a central cooling device that is located further away within the vehicle in order to cool food and drinks in the corresponding serving trolley.

In the modular cabin segment according to an embodiment of the invention a parking space can be arranged whose dimensions allow to accommodate a wheelchair in its folded state. Particularly preferably, for this purpose a parking position for a serving trolley is modified in such a manner that it provides the necessary width and height to accommodate the wheelchair and thus can be reconfigured from a parking position for a serving trolley to a parking position for a folded wheelchair, when desired. Normally, these dimensions exceed the space required for a serving trolley. If required, or if there is a corresponding operating regulation to carry the wheelchair of a person with limited mobility in the passenger cabin during the flight or during the journey, the cabin segment according to the invention thus allows non-blocking and practical accommodation of the wheelchair.

In an advantageous embodiment of the invention the parking space tailored to a wheelchair is arranged behind a vehicle attendant seat in an out-of-the-way position or in an in-use position. If a wheelchair is moved into this parking position this parking position is only very rarely used, and consequently the vehicle attendant seat arranged temporarily in front of it does practically not interfere. As an alternative or in addition to this a dedicated storage compartment for a wheelchair can be arranged behind the vehicle attendant seat in an in-use position or in an out-of-the-way position, wherein it is not imperative for the storage compartment to be used for receiving a service trolley.

In an advantageous embodiment any desired module of the cabin segment according to the invention could comprise a parking space for a serving trolley which in a delimitation surface comprises a rail or some other guide means that make it possible to readily insert the serving trolley and lock it into place, and at the same time, however, also makes it possible to accommodate a wheelchair in its folded state in the parking space. Furthermore, the parking space for the serving trolley in this case could comprise a cover flap, or at least a partial flap, that prevents the wheelchair from sliding out.

In an advantageous embodiment of the invention the at least one central module comprises a parking space for at least one "half-size" serving trolley as well as at least one storage compartment, wherein the vehicle attendant seat is held on the at least one central module in such a manner that in an in-use position and in an out-of-the-way position it is located in front of a parking space, preferably parallel to the transverse axis of the cabin.

Furthermore, it is not mandatory for the individual modules of the cabin segment according to an embodiment of the invention to be divided evenly in transverse direction; they can also, grouped according to the purpose of use, comprise projections, steps and indentations in transverse direction, which nonetheless make possible a composition to form an entire cabin segment. This means that, for example, at least part of an above-mentioned central module, which supports various functions, and a lateral segment module can be interconnected in the form of an enlarged lateral segment module. In this manner, for example, toilet compartments of a central module could be combined with toilet compartments of a lateral segment module. Furthermore, galley functions or storage compartments and parking spaces of a central module could be combined with similarly equipped lateral segment modules. In this manner one or two enlarged lateral segment modules could arise that can be combined to form one cabin segment. Separation of functions can simplify manufacture of the individual lateral segment modules.

Another aspect of the invention includes a cabin for a vehicle, which cabin comprises at least one cabin segment according to an embodiment of the invention, as explained above.

Yet another aspect of the invention includes a vehicle that comprises a cabin with at least one cabin segment according to an embodiment of the invention. In particular, this vehicle can be an aircraft, thus providing significant advantages when compared to known aircraft from the state of the art.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
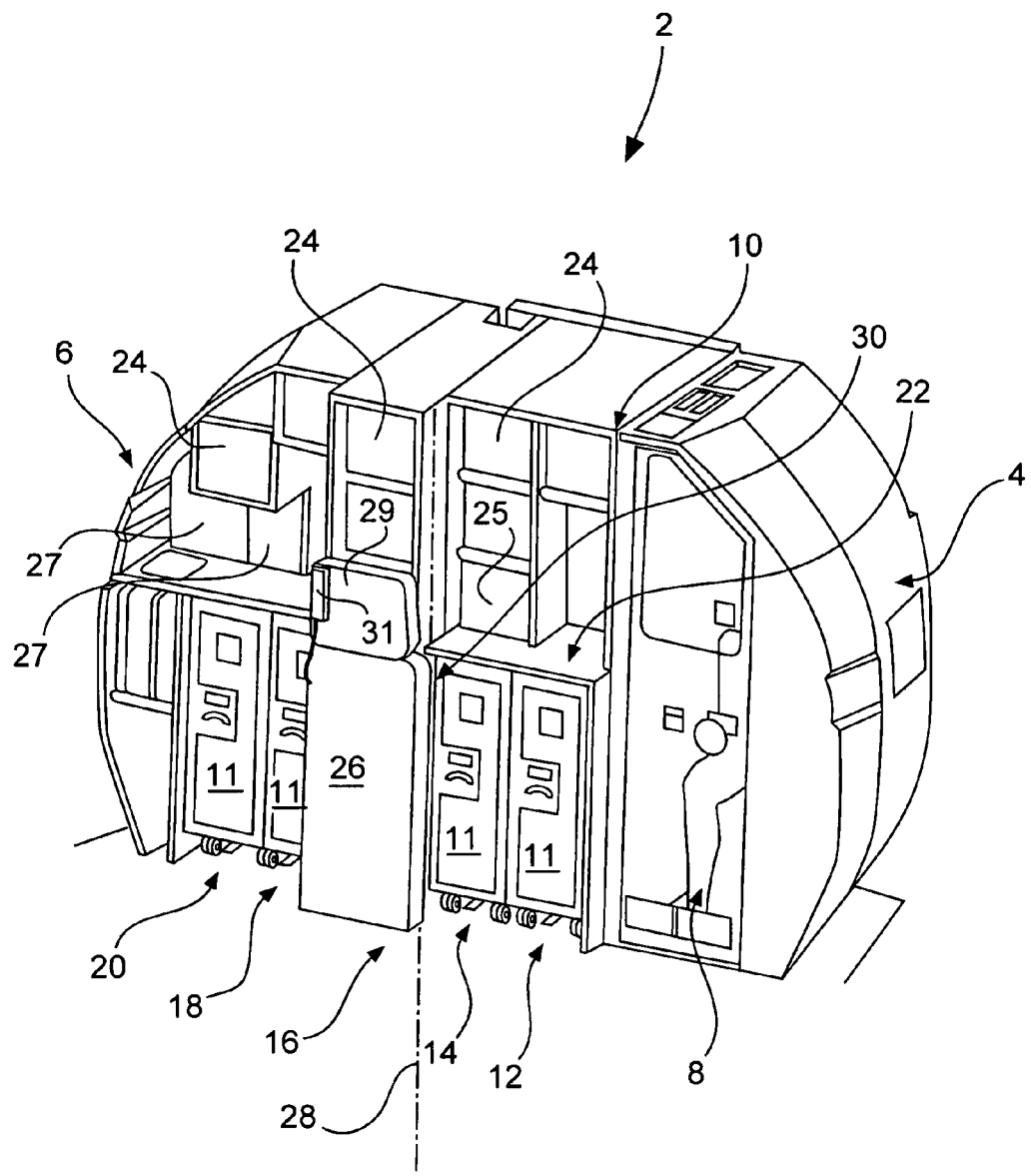
FIG. 1 shows a three-dimensional view of a cabin segment according to the invention.

FIG. 1 shows a cabin segment 2 according to an embodiment of the invention that at the selected location takes up the entire existing width of a vehicle cabin. The lateral faces 4 and 6 are formed in such a manner that they can adapt to conform to an inner wall of the vehicle. The cabin segment 2 is designed as a galley segment which on its right-hand side up to the right-hand wall 4 comprises a toilet compartment 8 that by way of a delimitation wall 10 is separated from the rest of the cabin segment 2 according to an embodiment of the invention. The region from this partition wall 10 to the left-hand wall 6 is taken up by a row of parking spaces 12, 14, 16, 18 and 20, arranged beside each other, for serving trolleys 11, on which parking spaces 12, 14, 16, 18 and 20 as an upper delimitation a work surface 22 is arranged, on top of which work surface 22 there are individual storage compartments 24 for receiving food that does not require cooling, cutlery or other items, which storage compartments 24 essentially take up the remaining design space provided. In this location, furthermore, electrical appliances and devices such as ovens 25, coffee machines or water heaters 27 can be provided.

According to an embodiment of the invention a vehicle attendant seat 26 is arranged on a side facing away from the cabin segment 2, thus blocking the parking space 16, which in the position of the vehicle attendant seat 26 as shown is not usable. The vehicle attendant seat 26 is held on an intermediate wall 30 so as to be pivotable on a hinge axis 28, which intermediate wall 30 separates the parking space 16 from the directly adjacent parking space 14. The hinge axis is preferably situated on an outer edge of the vehicle attendant seat 26 and is implemented by means of an articulated fitting or a hinge. By pivoting the vehicle attendant seat 26 by 180° on the hinge axis 28 the vehicle attendant seat 26 can be moved from an in-use position in the position shown in front of parking space 16 to the parking space 14 so that the parking space 16 is readily accessible, but instead the parking space 14 is temporarily not available.

Figure 2:
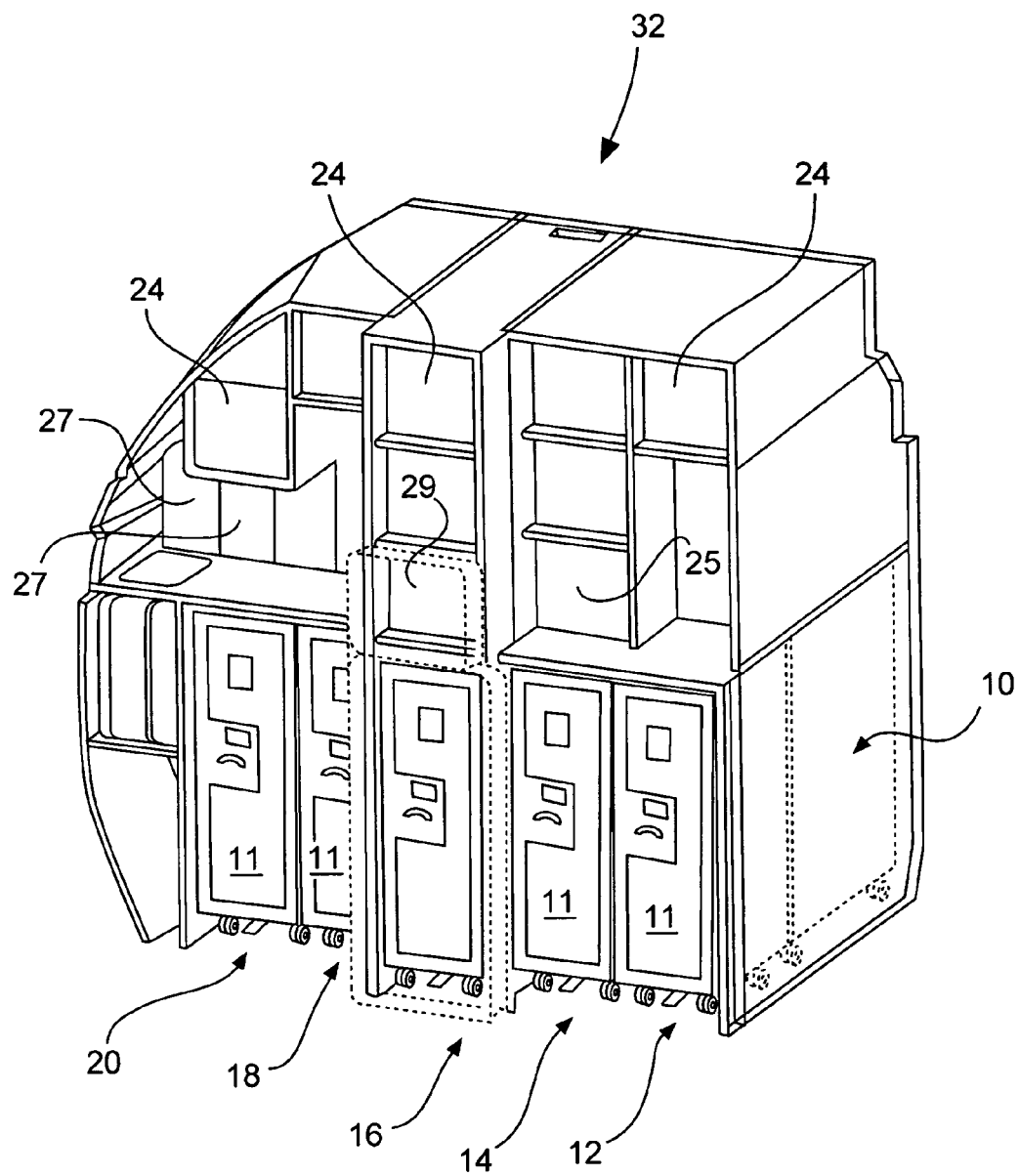
FIG. 2 shows a three-dimensional view of a lateral segment module of a cabin segment according to the invention.

The cabin segment according to an embodiment of the invention can be of a modular design. Thus, FIG. 2 shows, for example, a lateral module 32 of the cabin segment 2 according to the invention, which lateral module 32 merely accommodates the galley part and omits the toilet compartment 8. In this arrangement the vehicle attendant seat 26 is only shown by dashed lines so that the parking space 16, which is covered up in the in-use position, is completely visible. The lateral module 32 shown can accommodate a large number of serving trolleys 11, as shown by the dashed lines of the serving trolleys 11 arranged behind the sidewall 10. Overall, in the parking spaces 12, and 16, due to an increased depth when compared to conventional parking spaces for serving trolleys 11, in each case a "half trolley" and a "half-size trolley", respectively and a conventional trolley can be used. In the embodiment shown, on the adjacent parking spaces 18 and 20 two conventional serving trolleys 11 can be accommodated. Accordingly, the entire lateral module 32 can provide parking spaces for six and a half trolleys.

Figure 3:
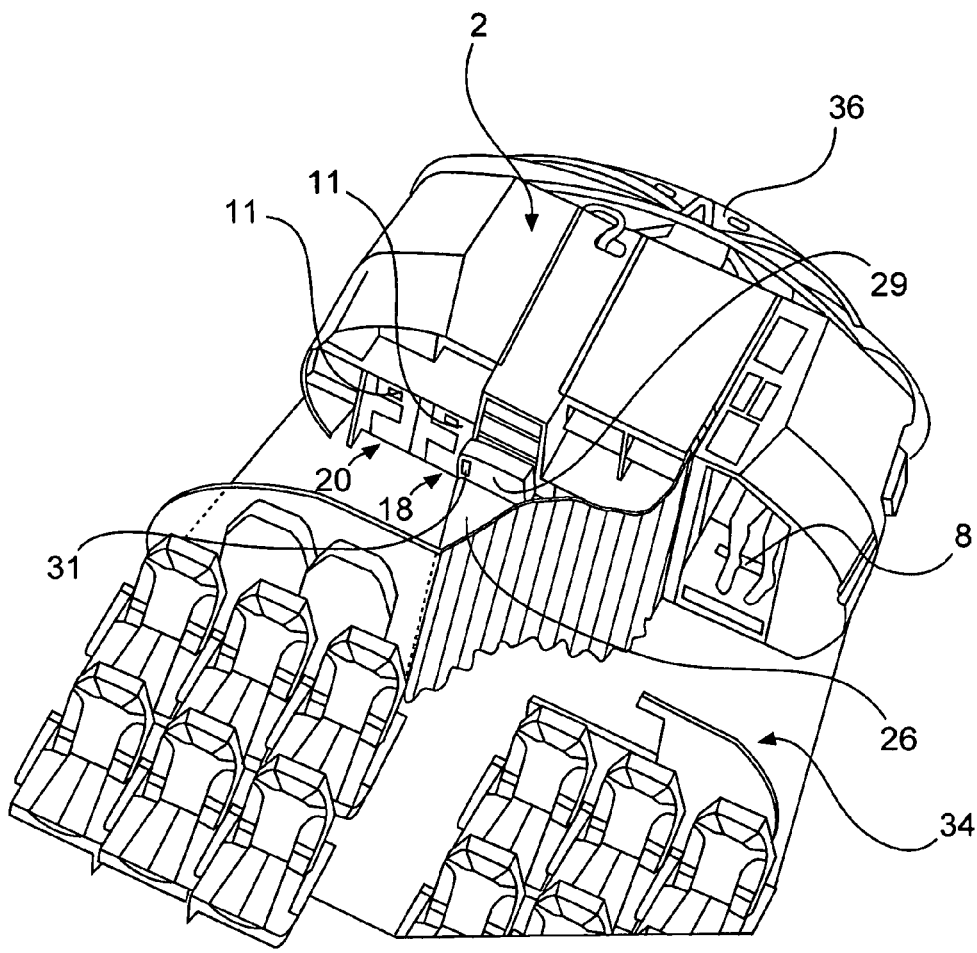
FIG. 3 shows a three-dimensional view of a cabin segment according to the invention integrated in a cabin of an aircraft.

FIG. 3 shows the cabin segment 2 according to an embodiment of the invention in a cabin 34 of a vehicle. This illustration shows a rear section of an aircraft cabin which is closed off towards the outside by a pressure bulkhead 36, wherein the pressure bulkhead 36 normally at least in some sections corresponds to a spherical segment. Advantageously the toilet compartment 8 can utilize the additional space gained as a result of the curvature of the pressure bulkhead 36, for example a wash basin or the like can be arranged or a toilet bowl can be spaced further from the front of the cabin segment 2 so as to provide more space within the toilet compartment 8. This design space can normally not be fully used, but by arranging the cabin segment 2 according to an embodiment of the invention in this region it is possible to provide more space for users of the toilet compartment 8 than is the case in conventional toilet monuments.

Figure 4A:
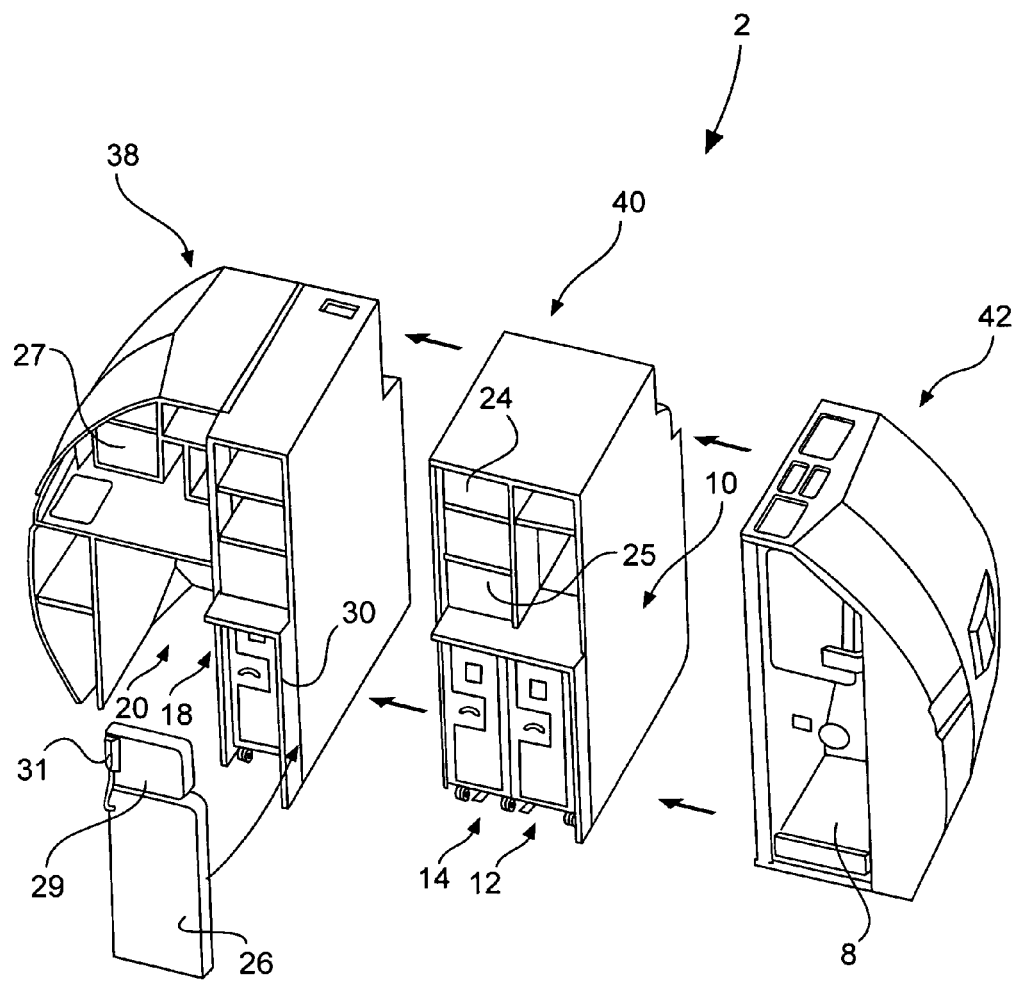
FIGS. 4a and 4b show a three-dimensional exploded view of two possible modular designs of the cabin segment according to the invention.
Figure 4B:
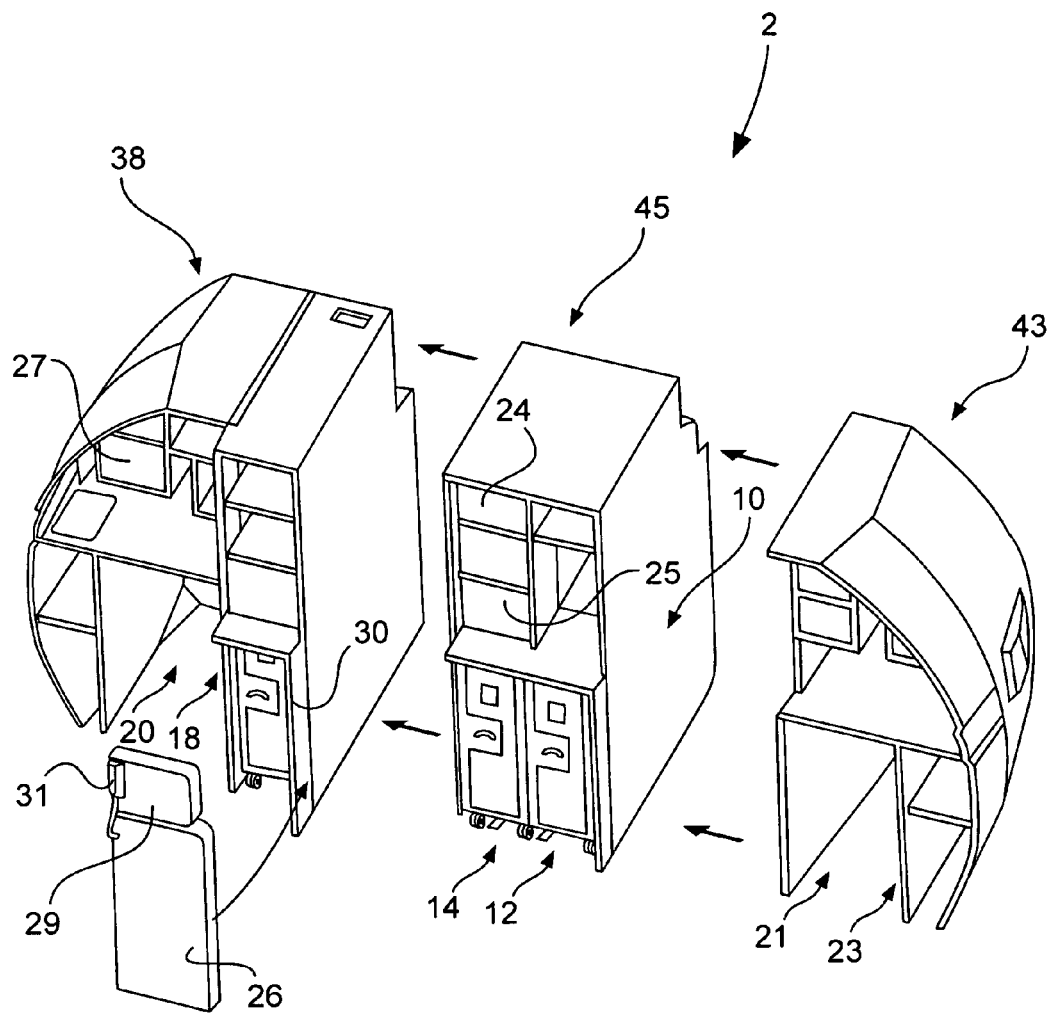

The design of a cabin segment 2 need not necessarily comprise only one component or two modules; instead, if required, it can also be provided by a combination of several modules as shown in FIGS. 4a and 4b.

FIG. 4a shows a first lateral segment module 38, a central module 40 and a second lateral segment module 42, designed as a toilet module, which modules are joined by their delimitation surfaces, thus forming an entire cabin segment 2 according to an embodiment of the invention. In this arrangement the integration of one or several vehicle attendant seats 26 on one or several intermediate walls or delimitation walls 30 is individually possible. With a comparatively wide width of the vehicle cabin 34, it makes sense to provide several vehicle attendant seats 26. As described in the context of FIG. 2, this arrangement can provide parking spaces for 6 and a half serving trolleys 11, wherein at the same time a vehicle attendant seat 26 and a toilet compartment 8 are provided. This illustration corresponds to size ratios in a rear section of a single-aisle aircraft of the series AIRBUS A320.

In FIG. 4b a different lateral segment module 43 is proposed that is designed so as to be mirror-inverted relative to an outer section of the first lateral segment module 38, thus providing two further parking spaces 21 and for serving trolleys 11. Thus, a cabin segment 45 according to an embodiment of the invention can provide parking spaces for up to 8 and a half serving trolleys 11 with the concurrent integration of a vehicle attendant seat 26.

Figure 5A:
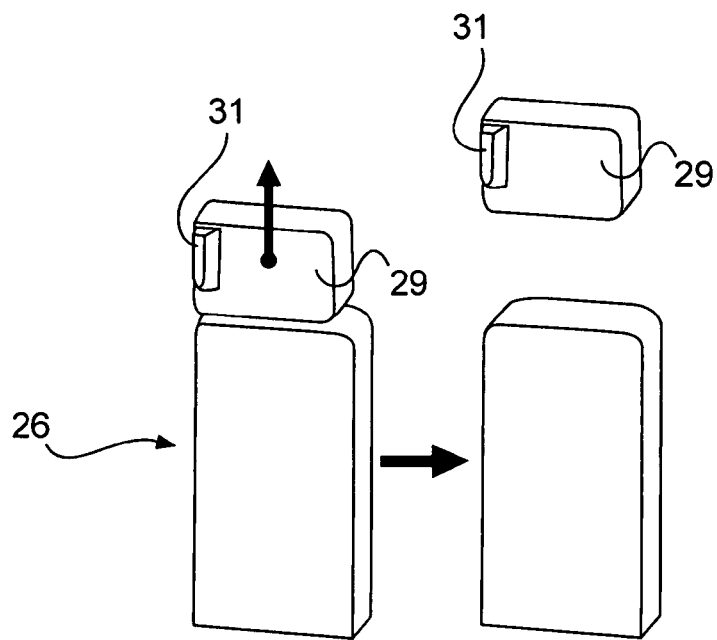
FIGS. 5a and 5b show a vehicle attendant seat with a removable or fold-down headrest.

FIG. 5a further shows a vehicle attendant seat 26 in which a headrest 29 is removable. In this way in an out-of-the-way position and in an in-use position space can be saved in order to make accessible a work surface 22, a storage compartment 24 or an oven 25. If the headrest 29 comprises a handset 31 for making announcements and the like, for this purpose an electrical quick connection should be provided.

Figure 5B:
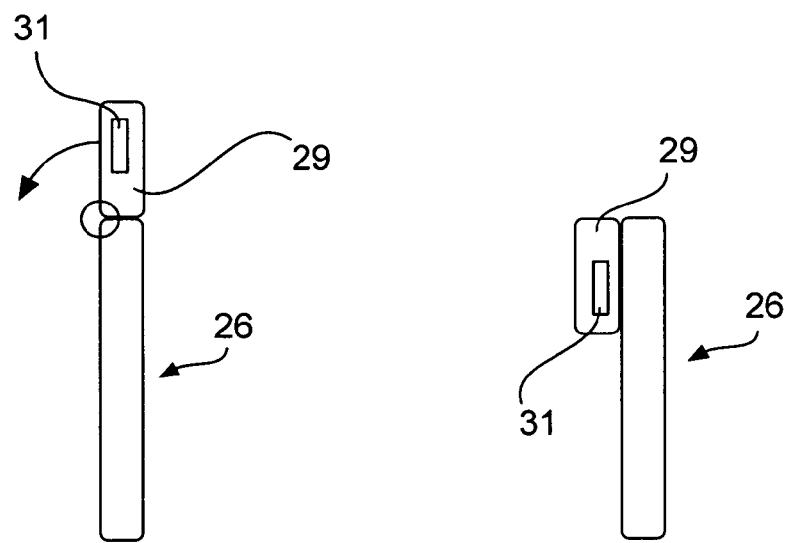

In contrast to the above, FIG. 5b shows a vehicle attendant seat 26 whose headrest 29 can be hinged down.

Figure 6A:
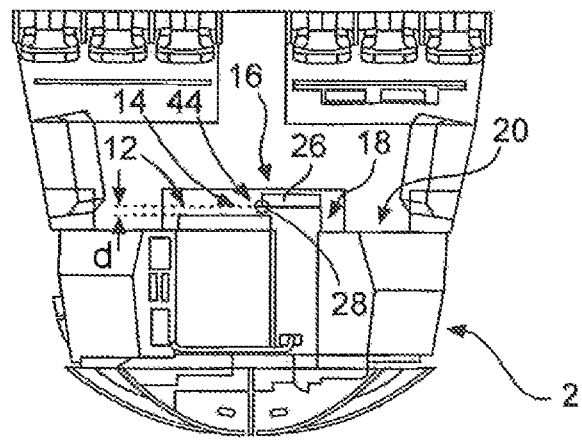
FIGS. 6a to 6c show three successive top views of a cabin segment according to the invention with a swing-around vehicle attendant seat.
Figure 6B:
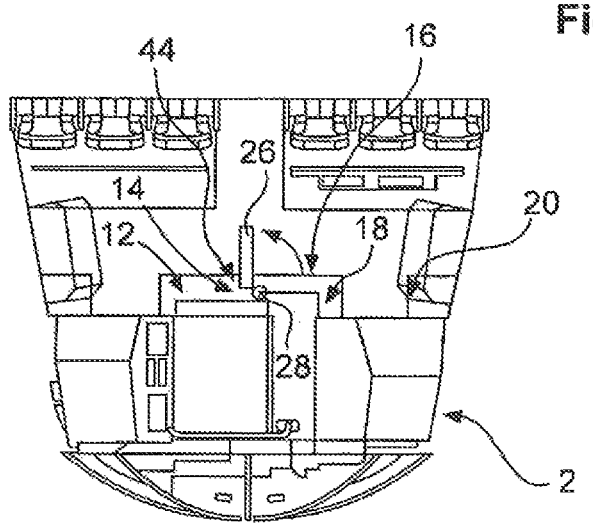
Figure 6C:
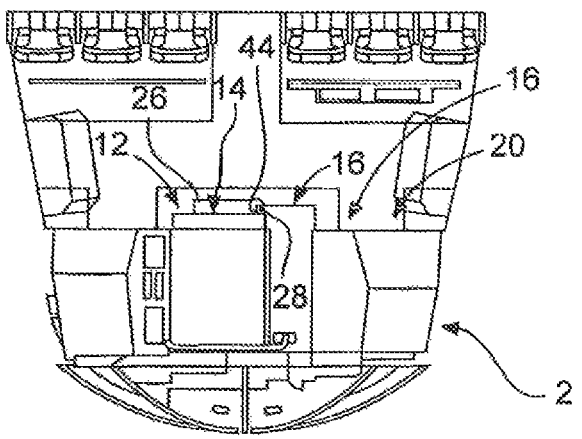

It is particularly advantageous to arrange the vehicle attendant seat 26 in the region of a projection 44 which in FIGS. 6a to 6c is shown in a series of top views of the cabin segment 2 according to an embodiment of the invention in a cabin 34. The projection 44 is formed by an offset arrangement, extending in the direction of depth, between the parking spaces 14 and 16, which offset in FIG. 6a is indicated by a space d, in the direction of depth, between the parking spaces 14 and 16. As a result of pivoting from an in-use position of FIG. 6a to an out-of-the-way position of FIG. 6c an almost flush side-by-side arrangement of the parking space 16 and the vehicle attendant seat 26 is created. The parking space 16 is thus fully accessible, while the parking space 14 is temporarily blocked.

It is not mandatory for the projection 44 to be achieved exclusively by an offset of the parking spaces 14 and 16, instead, said projection 44 can also be supported by the intermediate wall 30 extending into the cabin 34. The vehicle attendant seat 26 can be pivotally attached to the projecting end of the intermediate wall 30.

Overall, the projection 44 is to be designed in such a manner that the depth of the vehicle attendant seat 26 in the pivoted-back position shown in FIG. 6c, which is approximately the out-of-the-way position, approximately corresponds to the depth of the projection 44.

The cabin segment according to an embodiment of the invention can also be provided as a modular design in which lateral segment modules are used, optionally also central modules. The lateral segment modules delimit the cabin segment according to an embodiment of the invention to the interior wall of the aircraft and, depending on the design, extend in transverse direction into the cabin. Preferably, the individual modules are separated according to types so that, for example, toilets are incorporated in one module, while galley modules are incorporated in another module.

Figure 7:
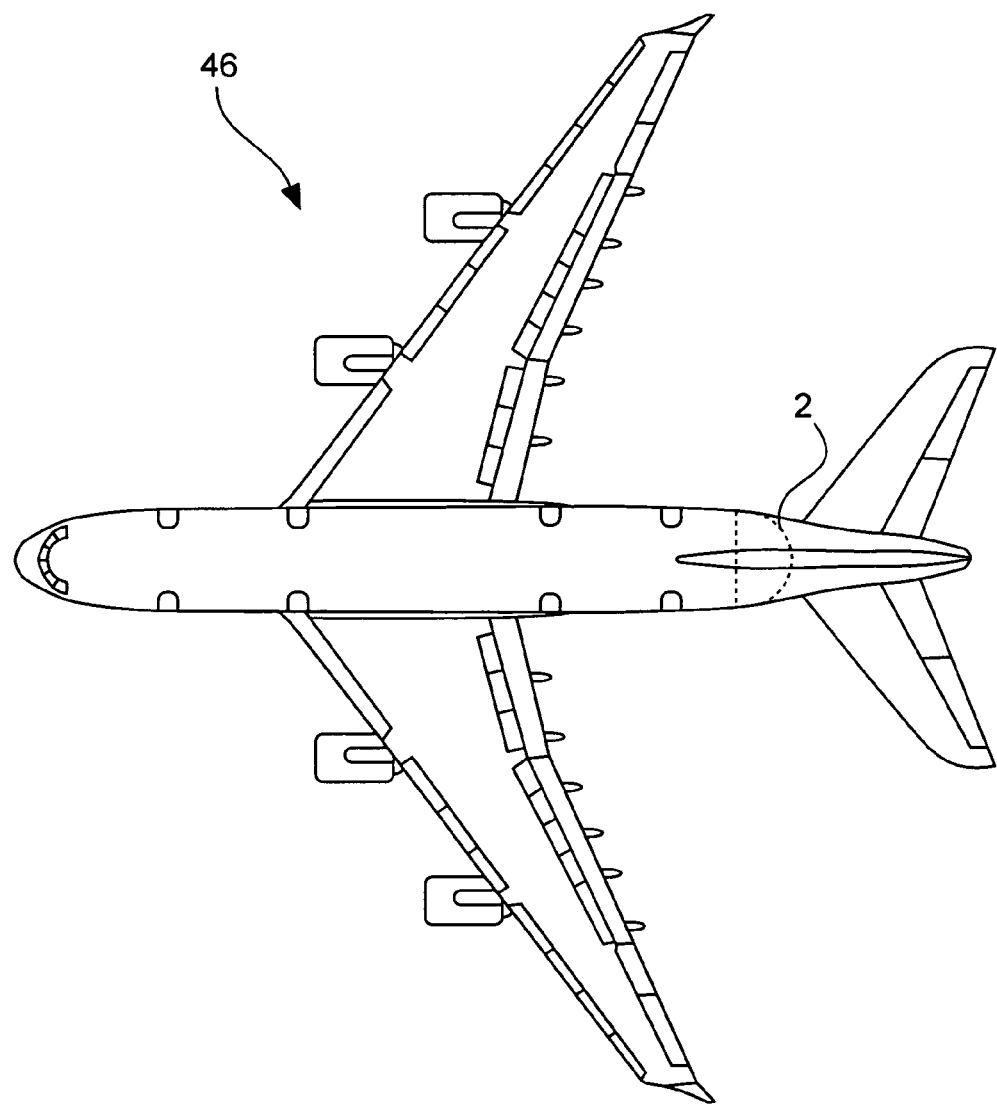
FIG. 7 shows an aircraft with a cabin segment according to the invention.

Finally, FIG. 7 shows an aircraft 46 with a passenger cabin 34 in which there is, for example, a cabin segment 2 according to an embodiment of the invention.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Cabin segment
4 Lateral face
6 Lateral face
8 Toilet compartment
10 Partition wall
11 Serving trolley
12 Parking space
14 Parking space
16 Parking space
18 Parking space
20 Parking space
21 Parking space
22 Work surface
23 Parking space
24 Storage compartment
25 Oven
26 Vehicle attendant seat
27 Water heater
28 Hinge axis
29 Headrest
30 Intermediate wall
31 Handset
32 Segment module
34 Cabin
36 Pressure bulkhead
38 Lateral segment module
40 Central module (central segment module)
42 Lateral segment module
43 Lateral segment module
44 Projection
45 Cabin segment
46 Aircraft

The invention claimed is:

1. A cabin segment for a vehicle, comprising:
at least first and second parking spaces, arranged side by side and separated from each other by at least one intermediate wall, for accommodating serving trolleys, and
a vehicle attendant seat which on one side is held on the at least one intermediate wall so as to be pivotable on an axis,
wherein the vehicle attendant seat is pivotable to an in-use position and to an out-of-the-way position,
wherein the in-use position and the out-of-the-way position are situated apart by 90° or more relative to the pivoting of the vehicle attendant seat
wherein the first parking space comprises a first receiving opening extending so as to be substantially parallel to a width of the cabin segment, and wherein the second parking position, arranged width-wise of the cabin segment so as to be adjacent to the first parking space, comprises a second receiving opening extending so as to be substantially parallel to the width of the cabin segment, the cabin segment further comprising:
between the first receiving opening and the second receiving opening, a projection extending in a depth of the cabin segment, wherein an outer edge of the vehicle attendant seat is held, so as to be pivotable on an axis, on the intermediate wall separating the first receiving opening from the second receiving opening.

2. The cabin segment of claim 1, wherein the in-use position and the out-of-the-way position are situated apart by substantially 180°.

3. The cabin segment of claim 1, further comprising a locking means for locking the vehicle attendant seat in the in-use position.

4. The cabin segment of claim 1, further comprising at least one storage compartment, arranged above the parking spaces, for accommodating objects.

5. The cabin segment of claim 1, wherein the vehicle attendant seat comprises a removable or fold-away headrest.

6. The cabin segment of claim 1, wherein the intermediate wall used for accommodating the at least one vehicle attendant seat projects beyond the adjacent parking spaces.

7. The cabin segment of claim 1, further comprising a first lateral segment module accommodating a toilet arrangement with at least one toilet compartment, and a second lateral segment module comprising at least one of the first and second parking spaces.

8. The cabin segment of claim 7, further comprising at least one central module arranged between the first lateral segment module and the second lateral segment module.

9. The cabin segment of claim 7, wherein the second lateral segment module is a galley module.

10. The cabin segment of claim 1, comprising a first lateral segment module configured as a galley module with at least one of the first and second parking spaces for serving trolleys, and a second lateral segment module with at least a third parking space for serving trolley.

11. The cabin segment of claim 1, further comprising a parking space with dimensions configured to accommodate a wheelchair in a folded state of the wheelchair.

12. A cabin for a vehicle, comprising at least one cabin segment, the at least one cabin segment comprising:
at least first and second parking spaces, arranged side by side and separated from each other by at least one intermediate wall, for accommodating serving trolleys, and
a vehicle attendant seat which on one side is held on the at least one intermediate wall so as to be pivotable on an axis,
wherein the vehicle attendant seat is pivotable to an in-use position and to an out-of-the-way position,
wherein the in-use position and the out-of-the-way position are situated apart by 90° or more relative to the pivoting of the vehicle attendant seat
wherein the first parking space comprises a first receiving opening extending so as to be substantially parallel to a width of the cabin segment, and wherein the second parking position, arranged width-wise of the cabin segment so as to be adjacent to the first parking space, comprises a second receiving opening extending so as to be substantially parallel to the width of the cabin segment, the cabin segment further comprising:
between the first receiving opening and the second receiving opening, a projection extending in a depth of the cabin segment, wherein an outer edge of the vehicle attendant seat is held, so as to be pivotable on an axis, on the intermediate wall separating the first receiving opening from the second receiving opening.

13. A vehicle, comprising a cabin, the cabin comprising:
at least one cabin segment comprising:
at least first and second parking spaces, arranged side by side and separated from each other by at least one intermediate wall, for accommodating serving trolleys, and
a vehicle attendant seat which on one side is held on the at least one intermediate wall so as to be pivotable on an axis, wherein the vehicle attendant seat is pivotable to an in-use position and to an out-of-the-way position, wherein the in-use position and the out-of-the-way position are situated apart by 90° or more relative to the pivoting of the vehicle attendant seat wherein the first parking space comprises a first receiving opening extending so as to be substantially parallel to a width of the cabin segment, and wherein the second parking position, arranged width-wise of the cabin segment so as to be adjacent to the first parking space, comprises a second receiving opening extending so as to be substantially parallel to the width of the cabin segment, the cabin segment further comprising:

between the first receiving opening and the second receiving opening, a projection extending in a depth of the cabin segment, wherein an outer edge of the vehicle attendant seat is held, so as to be pivotable on an axis, on the intermediate wall separating the first receiving opening from the second receiving opening.

14. The vehicle of claim 13, wherein the vehicle is an aircraft.

* * * * *